United States Patent [19]

Strong et al.

[11] Patent Number: 5,011,747
[45] Date of Patent: Apr. 30, 1991

[54] METAL/AIR BATTERY WITH PULSED GAS BUBBLING

[75] Inventors: David S. Strong, Battersea; John A. Dawson, Amherstview, both of Canada

[73] Assignee: Alcan International Limited, Montreal, Canada

[21] Appl. No.: 518,286

[22] Filed: May 4, 1990

Related U.S. Application Data

[63] Continuation of Ser. No. 269,062, Nov. 9, 1988, abandoned.

[51] Int. Cl.⁵ .................................................. H01M 12/04
[52] U.S. Cl. ........................................... 429/27; 429/67; 429/70
[58] Field of Search ................................. 429/27, 67, 70

[56] References Cited

U.S. PATENT DOCUMENTS

| | | | |
|---|---|---|---|
| 2,584,117 | 2/1952 | Elrod, Jr. ............... | 136/159 |
| 3,040,116 | 6/1966 | Gauvin .................. | 136/160 |
| 3,083,253 | 3/1963 | Sundberg ................ | 136/160 |
| 3,305,404 | 2/1967 | Sundberg ................ | 429/67 |
| 3,666,561 | 2/1970 | Chiku ................... | 429/70 |
| 4,221,847 | 9/1980 | Inkmann ................. | 429/70 |
| 4,269,906 | 5/1981 | Schmechtig ............. | 429/67 |

FOREIGN PATENT DOCUMENTS 2004409 3/1979 United Kingdom .

Primary Examiner—Donald L. Walton
Attorney, Agent, or Firm—Cooper & Dunham

[57] ABSTRACT

A metal/air battery is described having gas bubbled through the electrolyte. It includes: (a) a tank defining a reservoir for liquid electrolyte; (b) one or more metal-air cells disposed for immersion in electrolyte, each cell including at least one air cathode having a first surface disposed for contact with electrolyte and a second surface exposed to air and a metal anode disposed for immersion in electrolyte in facing spaced relation to the first cathode surface to constitute therewith an anode-cathode pair electrically coupled by electrolyte, (c) a bubbler tube extending horizontally in the electrolyte reservoir beneath each cell and serving to inject gas bubbles into electrolyte between the anode and cathode of each cell, and (d) means for providing a pulsating flow of gas to the bubbler tube(s).

5 Claims, 5 Drawing Sheets

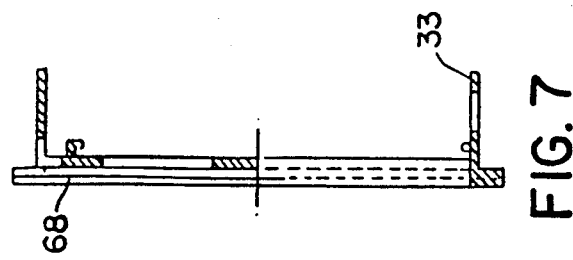
FIG. 7
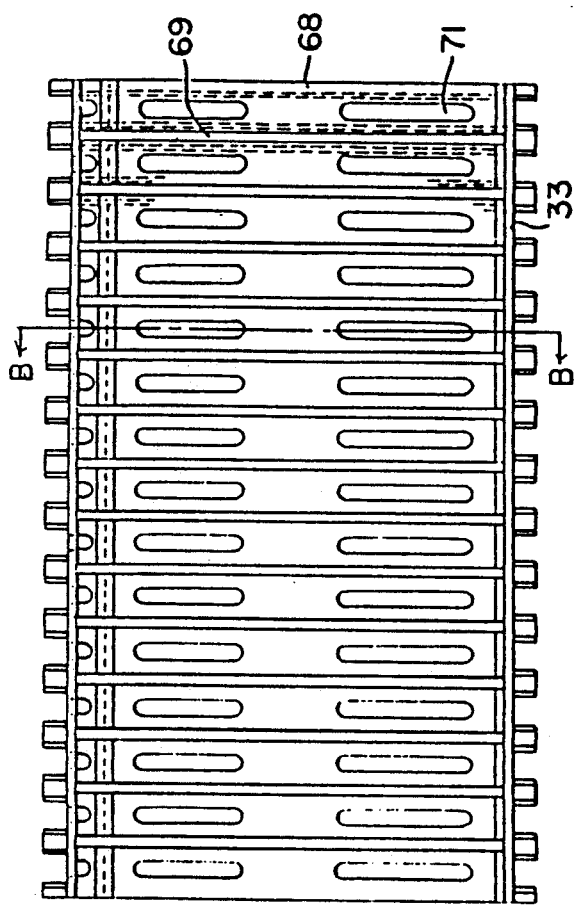
FIG. 6
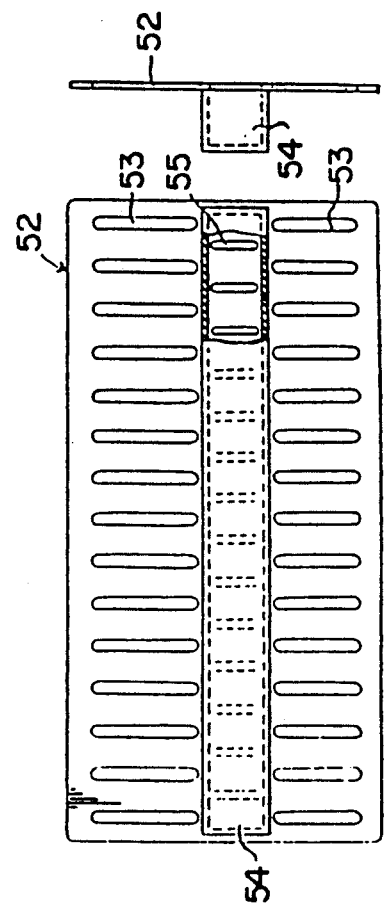
FIG. 9
FIG. 8

METAL/AIR BATTERY WITH PULSED GAS BUBBLING

This is a continuation of application Ser. No. 269,062 filed Nov. 9, 1988 now abandoned.

BACKGROUND OF THE INVENTION

The invention relates to metal/air batteries, and particularly such batteries having gas bubbled through the electrolyte.

Metal/air batteries produce electricity by the electrochemical coupling of a reactive metallic anode to an air cathode through a suitable electrolyte in a cell. The air cathode is typically a sheet-like member, having opposite surfaces respectively exposed to the atmosphere and to the aqueous electrolyte of the cell, in which (during cell operation) oxygen dissociates while metal of the anode oxidizes, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of active carbon (with or without an added dissociation-promoting catalyst) containing a finely divided hydrophobic polymeric material and incorporating a metal screen as the conductive element. A variety of anode metals have been used or proposed; among them, alloys of aluminum and alloys of magnesium are considered especially advantageous for particular applications, owing to their low cost, light weight, and ability to function as anodes in metal-/air batteries using a variety of electrolytes.

A typical aluminum/air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface. The discharge reaction for this cell may be written

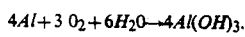

$$4Al + 3\,O_2 + 6H_2O \rightarrow 4Al(OH)_3.$$

As the reaction proceeds, large amounts of the aluminum hydroxide reaction product forms in the space between anode and cathode, and this ultimately interferes with cell operation, necessitating periodic cleaning and electrolyte replacement. It will be appreciated that cleaning and electrolyte replacement become quite complicated when the battery has multiple cells.

In metal-air batteries of this type, it has been found to be very beneficial to bubble air or other gas into the electrolyte in the gap between the anode and cathode. This is done by placing a bubble tube in the reservoir below the gap between the anode and cathode. The lifting action created by the rising gas in the electrolyte is used to circulate the electrolyte within each individual cell. The bubbling action also has other benefits, such as hydrogen gas dilution and heat removal.

However, there have been difficulties in achieving uniform distribution of the injected gas across a multi-hole bubble tube extending across beneath a cell and the problem is multiplied with a series of bubble tubes in a multi-cell battery. This lack of uniform distribution can be caused by many factors including surface tension effects, variations in air pressure, or plugged injector holes. The result is a reduction in cell performance and/or premature failure. This is especially serious in a multi-cell series battery where failure of one cell can shut down the entire battery.

It is an object of this invention to provide an air system which avoids the above problems.

SUMMARY OF THE INVENTION

According to this invention, the above problems can be solved by pulsating the gas flow to the bubble tube. This pulsation has been found to provide much greater gas injection uniformity than a steady gas flow, especially in multi-cell gas injection systems where a series of cell injector tubes operate from the same manifold.

Thus, one aspect of the present invention broadly contemplates the provision of a metal/air battery comprising a tank defining a reservoir for liquid electrolyte and one or more metal/air cells disposed for immersion in electrolyte. Each cell includes at least one air cathode having a first surface disposed for contact with electrolyte and a second surface exposed to air and a metal anode disposed for immersion in electrolyte in facing spaced relation to the first cathode surface, to constitute therewith an anode-cathode pair electrically coupled by electrolyte. A bubbler tube extends horizontally in the electrolyte reservoir beneath the space between the anode and cathode, this tube serving to inject gas bubbles into electrolyte between the anode and cathode. According to the novel feature, means are provided for pulsing the gas being injected through the bubbler.

The pulsing of the gas is a cyclic variation in injection pressure, caused either by the operation of a reciprocating air supply system or by a device which will create pressure pulsing in an otherwise steady air flow system. These pressure pulses create pressure waves within the injection tubes and manifold of a multi-cell system which cause the gas to distribute very evenly throughout the injector system. The pulsing has also been found to continuously purge the system of foreign matter, such as by-products from the chemical reactions in the cells.

The pulsing frequency has not been found to be particularly critical and has been found to work well with a reciprocating pump operating at tens of Hz, as well as low frequencies in the range of one Hz or less. It has been found that by lowering the pulse frequency, the gas supply device may operate at a lower duty cycle, thereby consuming less parasitic power draw on the battery system. Also, with less gas flow rate through the electrolyte, the electrolyte loss due to evaporation will be lower. Both factors can result in a longer battery life, while still maintaining the stirring, circulation and settling features, hydrogen dilution and heat removal features.

There is a point in the gas flow where further reduction may limit the heat removal and hydrogen dilution effects of the gas injection. However, this point depends on the battery design and operating parameters, and must be determined accordingly. In many cases heat removal may not be necessary due to naturally occurring heat transfer. Also, hydrogen dilution requirements may become less due to the development of more efficient anode materials.

The battery of this invention can be used with a variety of liquid electrolytes, including saline solutions or caustic solutions.

According to a preferred feature of the invention, the pulsed gas flow through bubbler tubes is used in association with a multi-cell battery of the type described in Strong et al, European Patent Publication No. 265,242, published Apr. 27, 1988. That battery has a tank defining a single continuous reservoir for liquid electrolyte. A plurality of air cathode assemblies, each assembly comprising a pair of air cathodes supported in an electrically non-conductive frame in electrically isolated relation to each other and defining between first surfaces thereof a liquid-tight air chamber open to ambient atmosphere, are removably insertable in the reservoir to expose second cathode surfaces remote from the air chamber to electrolyte therein. A plurality of metal anodes, one for each cathode, are disposed for immersion in electrolyte in the reservoir in spaced juxtaposed relation to the cathode second surfaces to constitute therewith a plurality of anode-cathode pairs each electrically coupled by electrolyte. The bubbler tubes are positioned directly beneath the anodes to bubble air upwardly through the electrolyte on each side of the anodes. Circuit means are provided for connecting the anode-cathode pairs in series to each other and to an external load. Electrically non-conductive means are also provided for engaging the cathode assembly frames with the tank, when the frames are inserted in the reservoir, to divide the reservoir into a plurality of separate and substantially electrically isolated electrolyte-holding zones each containing one anode and the cathode second surface juxtaposed thereto. This inhibits anode-to-anode current flow through the electrolyte. Each electrolyte-holding zone may also include a refuse collecting zone located below the bottoms of the anode and cathode.

Further features and advantages of the invention will be apparent from the detailed description, together with the accompanying drawings.

BRIEF DESCRIPTION OF THE DRAWINGS

FIG. 6 is a plan view of a top support frame;

FIG. 7 is a sectional view of FIG. 6 along line B—B;

FIG. 8 is a plan view of a top slide cover; and

FIG. 9 is an end elevation of the side of FIG. 8.

Figure 1:
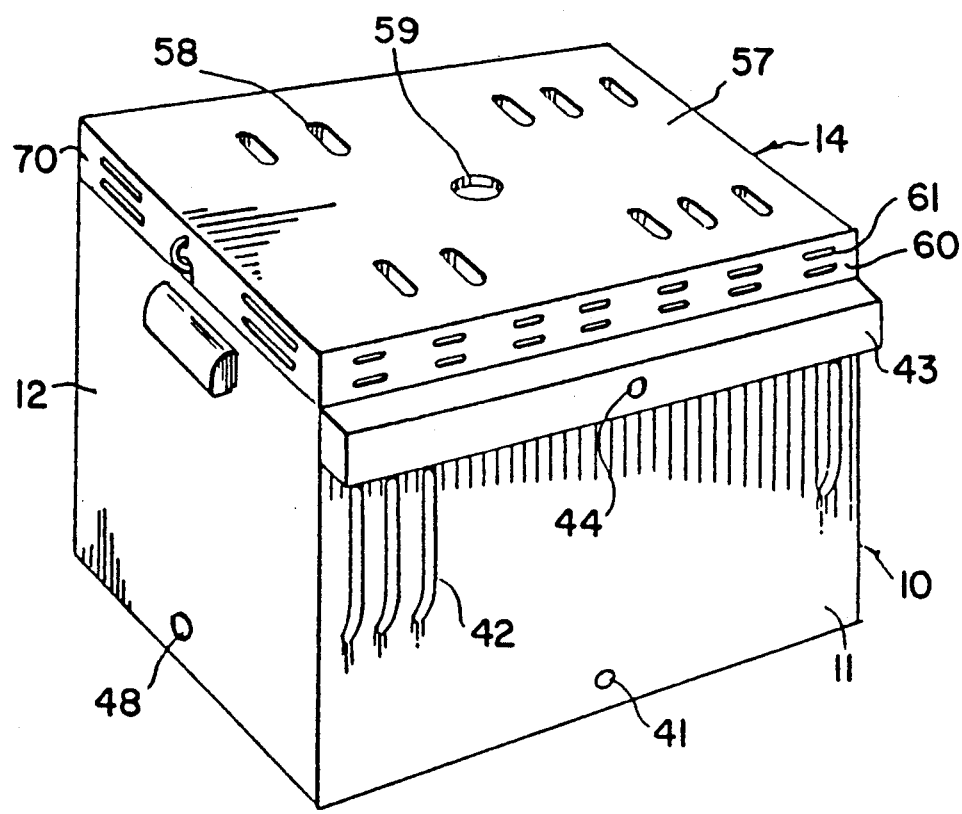
FIG. 1 is a perspective view of a battery embodying the invention.

The basic multi-cell design consists of an open top common electrolyte tank 10 having side walls 11, end walls 12, a recessed bottom wall 13 and a cover 14. Depending upon the size of the battery, a number of air cathode assemblies 15 fit into the tank 10 and create the individual cells.

Figure 2:
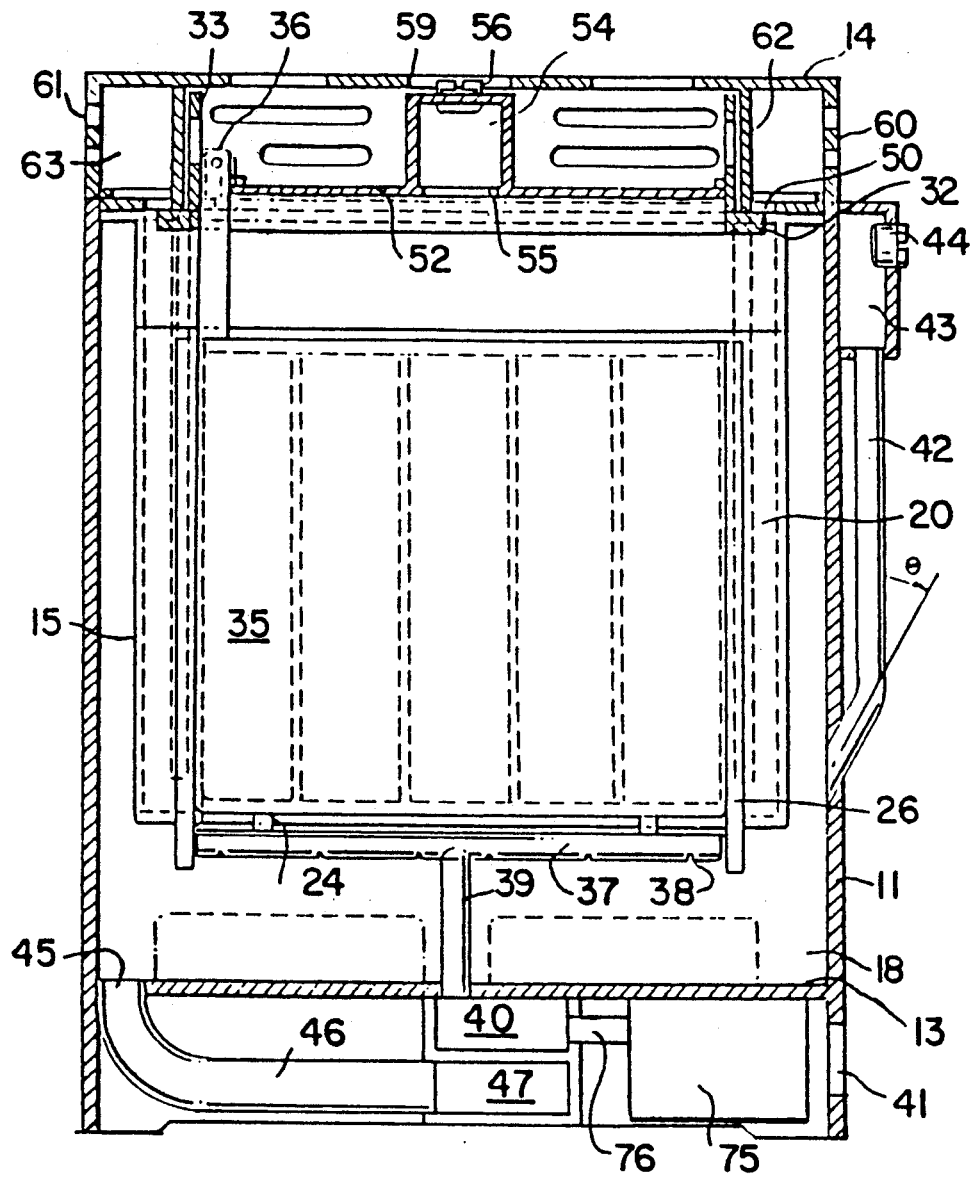
FIG. 2 is an elevational view, in section, of the battery of FIG. 1.
Figure 4:
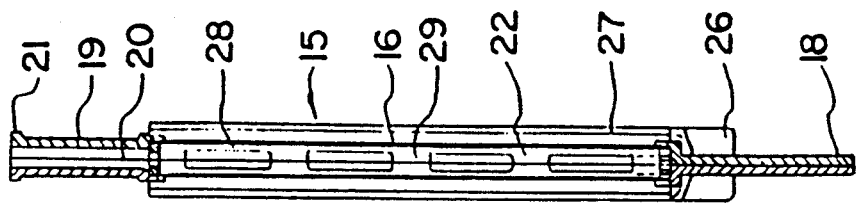
FIG. 4 is a sectional view of the cathode assembly of FIG. 3 along A—A.
Figure 3:
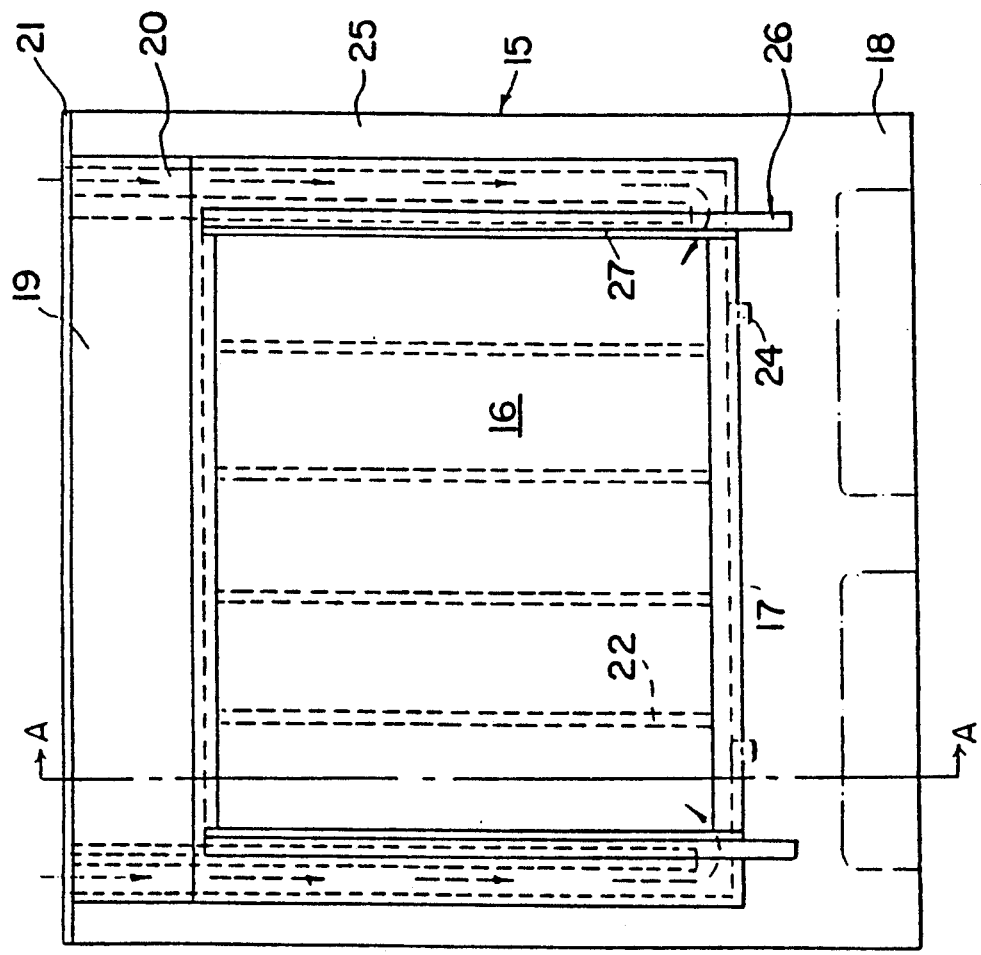
FIG. 3 is a side elevation of a cathode assembly used in the battery of FIGS. 1 and 2.

As will be seen from FIGS. 2, 3 and 4, each air cathode assembly 15 includes a pair of spaced apart cathodes 16 mounted in a support frame 17. For construction, each cathode 16 may be assembled within an individual frame as shown in FIG. 4 and the two frames are then join ed together to from the complete cathode assembly. Surrounding the sides and bottom of the cathode assembly are side fins 25 and a bottom fin 18. These are designed to fit snuggly within the electrolyte tank 10. The top portion 19 of the cathode assembly is in the form of a pair of walls defining therebetween a gap communicating with the air pocket.

Spacers 22 are positioned within the air pocket between the cathodes 16 and formed as two mating parts, each half consisting of vertical members 28 with projections 29. Each half is assembled with one cathode so that when two cathodes and frames are joined to form the cathode assembly, the projections 29 of each half contact each other respectively, thereby leaving air gaps as shown in FIG. 4. At the same time the solid portions formed between the air gaps provided a light weight, rigid stiffener between the cathodes.

Adjacent the cathodes 16 are a pair of air channels 20 extending from the top of the cathode assembly 15 and flow connecting to the bottom of the air pocket between the cathodes. This permits the drawing of fresh air into the air pocket.

Also positioned adjacent the cathodes are a pair of vertical spacer strips 26. Each of these spacer strips includes a recessed groove 27. When the cathode assemblies are juxtaposed in an electrolyte tank 10, the spacer strips contact each other forming vertical barriers between the active areas, i.e., the cathode/anode areas, and the outside edges of the battery. The recesses 27 of a contacting pair of spacer strips together form a slot into which a metal anode 35 slides. The anodes are limited in their movement downward by means of projecting abutments 24 mounted on frame 17.

The air cathode assemblies are supported from the top by slideways 32 on a support frame 68. Stiffener members 33 extend upwardly from the support frame and may include gripping slots for lifting the frame with the air cathode assembled installed. Slots 69 are provided in the frame 68 to receive the anodes 35 between the air cathode assemblies. Each anode includes a tab 36 to which electrical connections are made. The air cathode electrical connections can come up through the air pockets in the cathode assemblies, or may be molded into the assembly itself to prevent contact with the electrolyte. The current carrier for the cathode can be either a flexible wire or a relatively solid busbar.

The slots 69 in the cathode holder 68 through which the anodes 35 pass are closed during operation of the battery by sliding a slide plate 52 along the top of the support frame 68. Slide plate 52 include a main body portion with a projecting manifold 54 extending along the length thereof in a central region. This manifold connects at the bottom to a series of slots 55 and includes a single outlet 56 in the top thereof. These slots 55 communicate with the electrolyte chambers for each cell. During operation, any gases produced in the chemical reaction or used in the process are forced to exit through the slots 55 into the exhaust manifold 54.

Additional slots 53 are provided on each side of manifold 54 and these slots are positioned to communicate with the top ends of the air cathode assemblies providing communication with the air pocket of each cathode assembly, through slots 71 in top support frame 68.

Over the top of the tank 10 is the top cover 14 having a top panel 57 with a series of slots 58 extending therethrough and a central opening 59. The cover 14 also includes outer side panels 60, end panels 70 and intermediate panels 62 forming a pair of long thin chambers 63. Air inlet slots 61 are provided in side walls 60 so that cool fresh air may be drawn in through slots 61 and down through air intakes 50 into air channels 20. Warm air from the top of each air cathode air pocket may discharge upwardly through the slots 58 in the cover and exit gases from the electrolyte chambers discharge through manifold 54, outlet 56 and opening 59 in the cover.

The electrolyte tank 10 includes a liquid electrolyte manifold 43 with an inlet 44 for adding electrolyte to the system. Extending downwardly from the manifold are a series of tubes 42 which pass through the wall of the tank 10 in a lower region inclined at an angle $\theta$ of typically about 30°. Each tube 42 thereby communicates with an electrolyte zone within the tank. Thus, when activating the system by filling it with electrolyte, the manifold 43 provides a common point for adding the electrolyte from which the individual cells are filled. During this filling period, and throughout the operation of the battery, this side manifold maintains a uniform electrolyte level in all cells, by virtue of the common attachment for pressure and level equalization. No common electrolyte path can be allowed directly from cell to cell without involving significant shunt current loses. Therefore, relatively long tubes are used between the manifold 43 and the electrolyte tank 10, creating a long path from cell to cell, hence minimizing shunt currents. The point at which these tubes connect to the tank 10 and the angle at which they are mounted is also for a flush cleaning process at the end of the battery operation.

Figure 5:
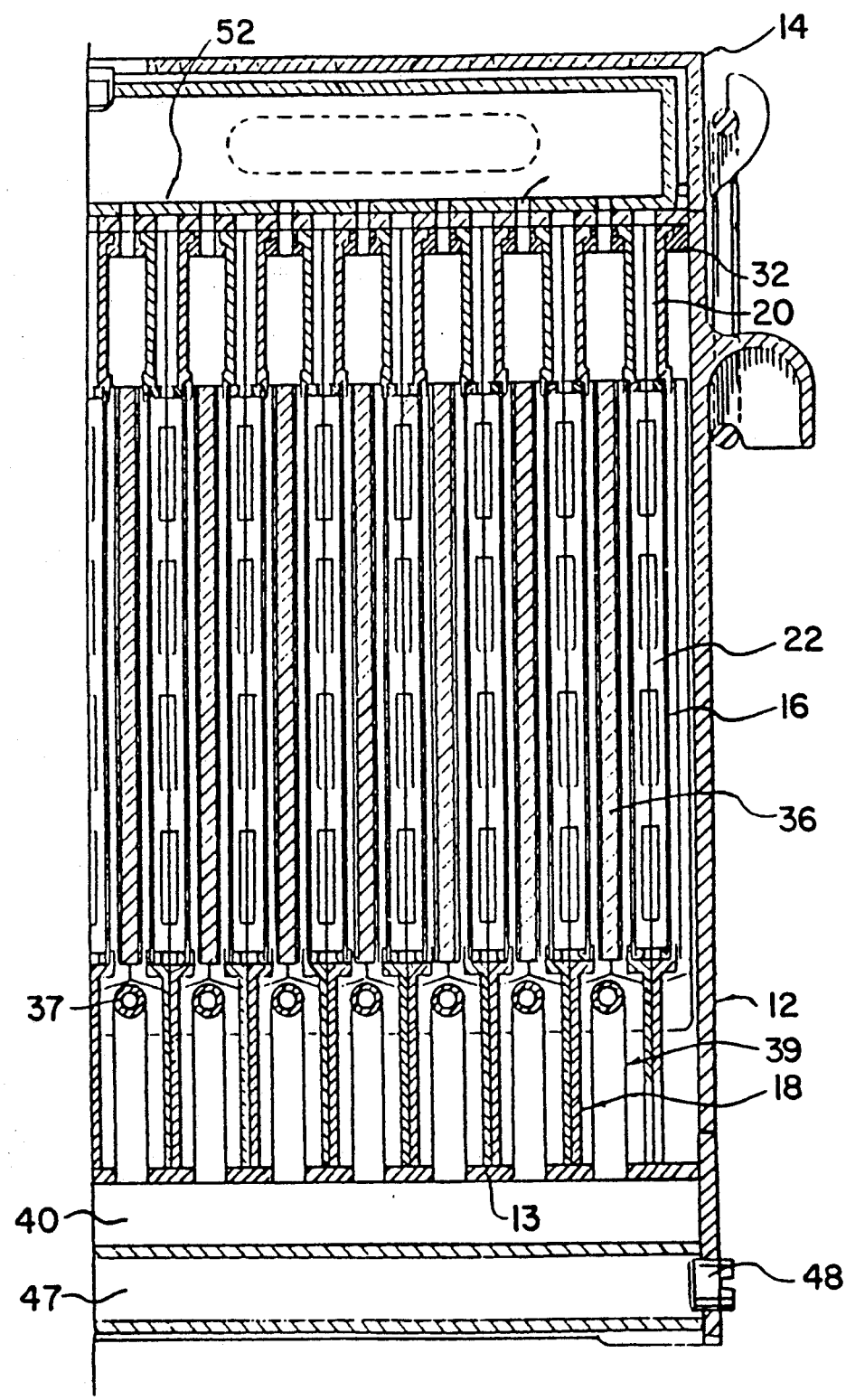
FIG. 5 is a fragmentary side elevational view in section of the battery of FIG. 1.

Inside tank 10 are a series of T-tubes including a cross tube 37 with air outlet holes 38 and an upwardly extending arm 39. As will be seen from FIG. 5, the tubes 37 are positioned directly beneath the anodes 35. The bottom end of each vertical tube 39 communicates with an air manifold 40. Air or other gas is fed into manifold 40 from a pump 75 mounted beneath recessed bottom wall 13. Outside air may be drawn into the pump through inlet 41 and is fed into manifold 40 via inlet line 76. This system is used to inject air or other gas into the electrolyte which results in many benefits such as stirring, hydrogen gas dilution and heat removal. The lifting action created by the rising gas in the electrolyte is used to circulate the electrolyte within each individual cell.

In order to provide the pulsating gas flow through the manifold 40 and bubbler tubes 37, a variety of devices may be used. For instance pump 75 may be a reciprocating air pump or it may be any type of air pump used in conjunction with a pulse control device which pulsates the air flowing through inlet tube 76. The pump 75 is preferably powered by parasitic power from the battery system. Alternatively, an external air supply may be used in conjunction with the pulse control device.

The vertical spacers 26 on adjoining air cathode assemblies which contact to form baffles are inherent to this process. It can be seen in FIG. 2 that the baffles 26 extend to just below the cross pieces of the air injection tube 37. This ensures that all the gas injected is captured between the baffles and forces that part of the electrolyte to rise. When the bubbles reach the surface of the electrolyte, they escape and are exhausted through the exhaust manifold 54, having diluted the hydrogen gas to a safe level. The lifting of the electrolyte between the baffles creates a spill-over circulation down the outside of the baffles. This electrolyte then reaches the bottom of the sump (in the bottom of tank 10), where the velocity decreases substantially. At this point, much of the solid hydroxide by-product, which tends to be in a granular form due to the stirring action, drops to a stagnant area at the bottom of the cell. The electrolyte that recirculates through the cell tends to be relatively free of solids, although a certain amount of fines stay within the circulating electrolyte throughout the battery operation, resulting in a whitish-coloured electrolyte. The removal of the solids in this fashion prevents the build-up of by-product on the electrodes, resulting in a much longer battery life and much easier cleaning.

The space beneath the recessed bottom floor 13 of tank 10 also contains a flushing manifold 47. Connected to manifold 47 are a series of tubes 46 which open into the bottom of the electrolyte reservoir through holes 45 in bottom wall 13, one such hole 45 being positioned beneath each electrolyte zone. During operation of the battery, the manifold 47 and tubes 46 fill up with electrolyte and remain stagnant throughout the battery life. However, at the end of the battery life, when the electrolyte is exhausted, a valve may be opened on the end or bottom of the flushing manifold 47, and the exhausted electrolyte and by-product is flushed out. Again, it should be noted that tubes 47 preferably provide long pathways between cells to prevent shunt currents.

We claim:

1. A metal-air battery comprising:
   (a) a tank defining a reservoir for liquid electrolyte;
   (b) one or more metal-air cells disposed for immersion in electrolyte, each cell including at least one air cathode having a first surface disposed for contact with electrolyte and a second surface exposed to air and a metal anode disposed for immersion in electrolyte in facing spaced relation to the first cathode surface to constitute therewith an anode-cathode pair electrically coupled by electrolyte,
   (c) a bubbler tube extending horizontally in the electrolyte reservoir beneath each cell and serving to inject gas bubbles into electrolyte between the anode and cathode of each cell, and
   (d) means for providing a flow of gas only to the bubbler tube(s), said gas being substantially free of any said electrolyte, and
   (e) means for pulsating the flow of gas passing through the bubbler tube.

2. A battery according to claim 1 wherein the means for providing and pulsating a flow of gas to the bubbler tube comprises a reciprocating air pump.

3. A battery according to claim 1 wherein the means for providing and pulsating a flow of gas to the bubbler tube comprises an air pump producing a steady air flow discharge and a pulse control device for providing pulsations in the air flow discharge.

4. A battery according to claim 2 wherein the air pump is mounted within the battery and is actuated by parasitic power from the battery system.

5. A battery according to claim 1 wherein the metal-air cells comprise:
   (i) a plurality of air cathode assemblies, each assembly comprising a pair of air cathodes supported in an electrically non-conductive frame in electrically isolated relation to each other and defining between first surfaces thereof a liquid-tight air chamber open to ambient atmosphere, and said assemblies being removably insertable in the reservoir to expose second cathode surfaces remote from the air chamber to electrolyte therein;
   (ii) a plurality of metal anodes, one for each cathode, disposed for immersion in electrolyte in the reservoir in spaced juxtaposed relation to the cathode second surfaces to constitute therewith a plurality of anode-cathode pairs each electrically coupled by electrolyte;

(iii) circuit means for connecting said anode-cathode pairs in series to each other and to an external load; and (iv) means for engaging the cathode assembly frames with the tank, when the frames are inserted in the reservoir, to divide the reservoir into a plurality of separate and substantially electrically isolated electrolyte-holding zones each containing one anode and the cathode second surface juxtaposed thereto, so as to inhibit anode-to-anode current flow through the electrolyte, and each electrolyte-holding zone including a refuse collecting zone located below the bottoms of the anode and cathode.

* * * * *